No. 705,953. Patented July 29, 1902.
J. E. NEIHYSEL.
KNOCKDOWN BOX.
(Application filed Feb. 6, 1902.)

(No Model.) 2 Sheets—Sheet 1.

Witnesses  
H. S. Dieterich  
Harold Lewis

Inventor  
Jacob E. Neihysel  
by Knight Bros  
Attorneys

THE NORRIS PETERS CO., PHOTO-LITHO., WASHINGTON, D. C.

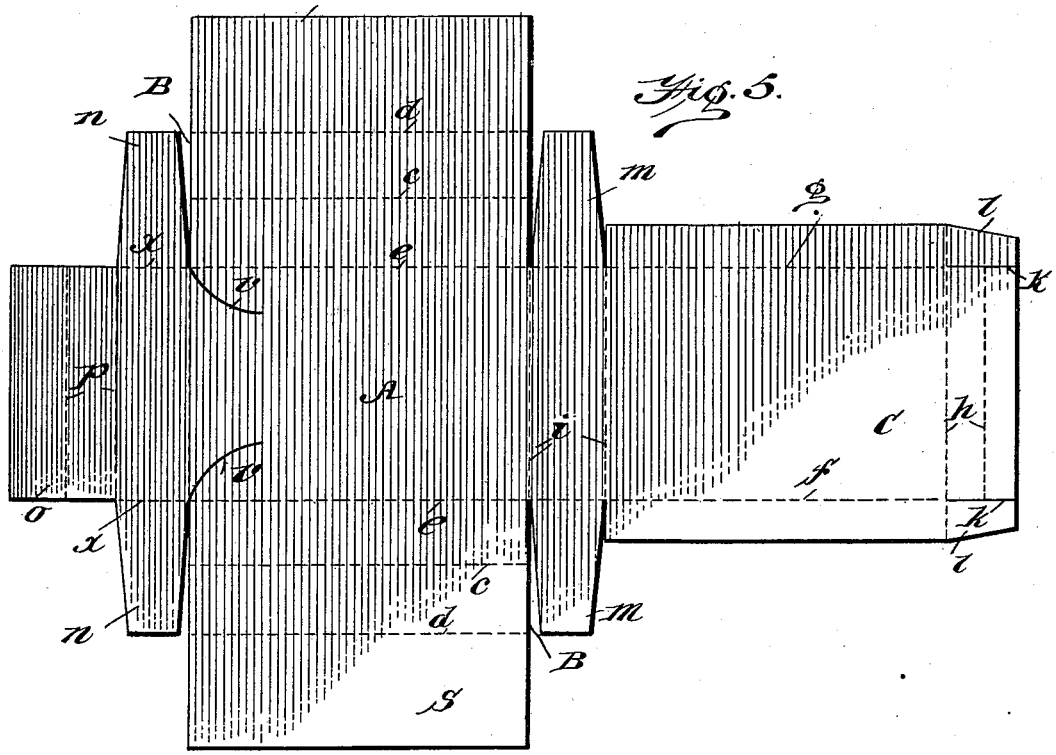

UNITED STATES PATENT OFFICE.

JACOB EMILE NEIHYSEL, OF NEW ORLEANS, LOUISIANA.

KNOCKDOWN BOX.

SPECIFICATION forming part of Letters Patent No. 705,953, dated July 29, 1902.

Application filed February 6, 1902. Serial No. 92,903. (No model.)

*To all whom it may concern:*

Be it known that I, JACOB EMILE NEIHYSEL, a citizen of the United States, residing at New Orleans, in the parish of Orleans and State of Louisiana, have invented certain new and useful Improvements in Knockdown Boxes, of which the following is a specification.

Figure 1:
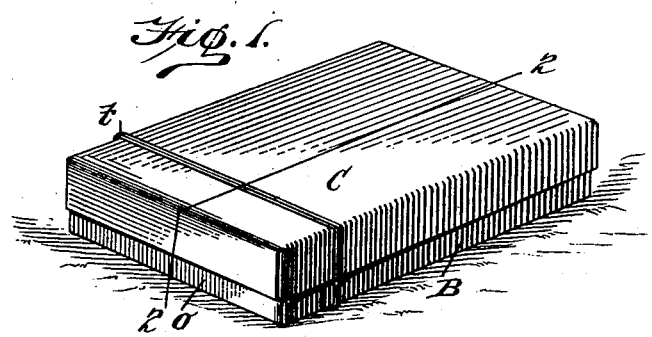
Figure 2:
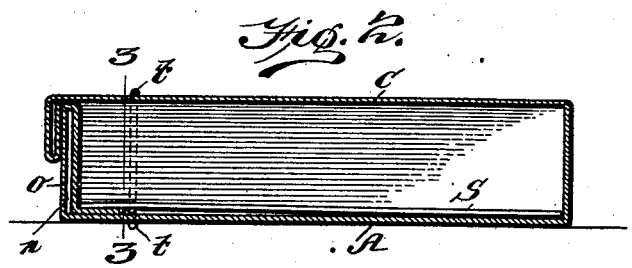
Figure 3:
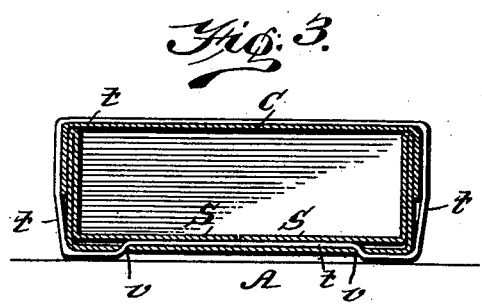

In the drawings, Figure 1 is a perspective view of a box embodying my invention. Fig. 2 is a vertical section of the same on the line 2 2, Fig. 1. Fig. 3 is a transverse vertical section of my improved box on the line 3 3, Fig. 2. Fig. 4 is a perspective view of my improved box, the cover being open. Fig. 5 is a plan view of the blank from which the box is formed.

A indicates the bottom of the box proper, from each side of which extends a flap B, said flaps having folding creased lines $c$, $d$, and $e$. C is the cover of the box, integral with and extending from one end of the bottom A, said cover being creased along the lines $f$ and $g$ to form side folds, and creased along the lines $h$ to form end folds for the cover, and creased along the lines $i$ to form an end fold for the box proper.

$k$ indicates shear cuts formed in the extreme outer end of the cover-section C and extending inward as far as the inner line $h$, whereby the flaps $l$ are formed. At the base of the cover-section C a tongue $m$ is formed on each side of said section, extending from the dotted lines $f$ and $g$ of the cover-section outward to a point in line with the fold-line $d$ of the side flaps of the box.

$n$ indicates tongues formed integral with the other end of the bottom of the box A and extending outwardly to one side to a point in line with the dotted lines $d$ of the side flaps, these tongues $n$ being substantially like the tongues $m$. Extending beyond the middle portion of these tongues $n$ is an end flap $o$, which has creased folding-lines $p$.

$v$ indicates shear cuts formed in the bottom of the box and extending outward to the base of the tongue's end, all as shown in Fig. 5 of the drawings.

In forming a box from the blank above described the side flaps B are folded first along the lines $e$, thence along the lines $c$, whereby the flap is folded upon itself, thence along the line $d$, whereby the portions $s$ of the side flaps form a supplemental bottom in the box, the edges of the flaps abutting snugly against each other, thereby acting as a brace to hold the folded portions of the sides B firmly in place. Before the side flaps are folded into position the end flap is folded along the dotted lines $p$, and the tongues $n$ are flolded along the dotted lines $x$ and the end flap bent inward, so that the tongues $n$ are in a vertical position along the dotted lines $e$. The end section carrying the cover is then bent along the dotted lines $i$ and the tongues $m$ folded in the same position as that just described with reference to the tongues $n$, whereupon the side flaps are folded, as hereinbefore described, so that the portions $s$ of the side flaps cover the portion $o$ of the end flap, as shown in Fig. 2. The section constituting the cover is then bent as follows: The tongues $l$ are bent to a vertical position along one of the dotted lines $h$. Then the extreme outer edges of the cover-section are bent upwardly along the dotted lines $f$ and $g$. Then the portion of the cover remaining between the tongues $l$ is bent along the dotted lines $h$, so as to cover and block the tongues $l$ in position, thereby holding the extreme outer portions of the cover-section in a position at right angles to said cover-section. Before any folds are made in the blank an endless flexible band $t$ is secured in the shear cuts $v$, as clearly shown in Fig. 3.

From Figs. 2 and 3 it will be seen that the interior of a box formed from a blank according to my invention is smooth and practically unbroken, there being no crevices through which the contents of the box can escape or sift. It will also be seen that by reason of the shear cuts $v$ in the bottom of the box I provide means whereby a locking member, such as an elastic band, may be secured to the box to hold the cover in a closed position upon the top of the box and at the same time secure such closing means against accidental displacement. All the parts of this blank being integral, I am able to construct a cheap, simple, and durable box from a minimum amount of material.

Having thus described my invention, what I claim as new, and desire to secure by Letters Patent, is—

1. A knockdown box, the box portion having an end flap bent upon itself and turned down inside said portion, slits formed in the bottom of the box radiating from the corners of the base of the said flap toward the center of the box-bottom, side flaps, a portion of each of which is folded upon itself and folded down into the box portion, the remaining portion of the side flaps lying flat upon the bottom of the box portion with their contiguous edges snugly abutting, whereby the folds in the side flaps are firmly braced against each other, the unfolded portions of the side flaps forming a supplemental bottom in the box portion, and an end wall bent up from the bottom, a cover integral with the same and bent over the box, and an endless flexible band secured in the said slits in the bottom of the box adapted to be secured around and secure the box in a closed position.

2. A knockdown box, the box portion having an end flap bent upon itself and turned down inside said portion, slits formed in the bottom of the box radiating from the corners of the base of said flaps toward the center of the box-bottom, side flaps, a portion of each of which is folded upon itself and folded down into the box portion, the remaining portion of the side flaps lying folded upon the bottom of the box portion with their contiguous edges snugly abutting whereby the folds of the side flaps are firmly braced against each other, the unfolded portions of the side flaps forming a supplemental bottom in the box portion, an end wall bent up from the bottom, a cover integral with the same and bent over the box, tongues formed integral with and extending sidewise from the base of the end flaps or folds, and adapted to lock between the folded portions of the side flaps, and an endless flexible band secured in the side walls in the bottom of the box and adapted to pass around and secure the box in a closed position.

The foregoing specification signed this 28th day of January, 1902.

JACOB EMILE NEIHYSEL.

In presence of—
 JOHN T. BATH,
 A. E. BLACKMAR.